United States Patent
Killinger

(10) Patent No.: US 7,190,635 B1
(45) Date of Patent: Mar. 13, 2007

(54) SYSTEM AND METHOD FOR MULTI-BEAM LASER VIBROMETRY TRIANGULATION MAPPING OF UNDERGROUND ACOUSTIC SOURCES

(75) Inventor: Dennis Killinger, Temple Terrace, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 11/277,561

(22) Filed: Mar. 27, 2006

Related U.S. Application Data

(63) Continuation-in-part of application No. 11/277,416, filed on Mar. 24, 2006, now abandoned.

(60) Provisional application No. 60/594,286, filed on Mar. 25, 2005.

(51) Int. Cl.
*G01S 3/00* (2006.01)

(52) U.S. Cl. .................................... 367/128

(58) Field of Classification Search ............... 367/128, 367/140, 149; 356/3, 502
See application file for complete search history.

(56) References Cited

U.S. PATENT DOCUMENTS

| 4,121,470 A | * | 11/1978 | Dahms | ............ 356/502 |
|---|---|---|---|---|
| 4,925,297 A | | 5/1990 | Brown | |
| 6,301,967 B1 | | 10/2001 | Donskoy et al. | |

* cited by examiner

*Primary Examiner*—Dan Pihulic
(74) *Attorney, Agent, or Firm*—Molly L. Sauter; Smith & Hopen, P.A.

(57) ABSTRACT

The system and method in accordance with the present invention provides a non-contact detection and location of acoustic sources, which will be useful for locating signaling humans and will assist in the structural analysis of damaged building based upon structural movement. In accordance an embodiment of the present invention is provided a multi-beam, non-contact, laser vibrometer adapted to locate, via triangulation, an acoustic source buried underground.

18 Claims, 2 Drawing Sheets

2(a)

2(b)

SYSTEM AND METHOD FOR MULTI-BEAM LASER VIBROMETRY TRIANGULATION MAPPING OF UNDERGROUND ACOUSTIC SOURCES

CROSS REFERENCE TO RELATED APPLICATION

This application is a continuation-in-part and claims priority to U.S. Utility patent application Ser. No. 11/277,416 now abandoned filed Mar. 24, 2006 by the same inventor entitled: "System and Method for Multi-Beam Laser Vibrometry Triangulation Mapping of Underground Acoustic Sources" which claims priority to U.S. Provisional Patent Application No. 60/594,286 filed Mar. 25, 2005.

BACKGROUND OF INVENTION

Current technology for detecting and mapping buried acoustic sources often involves the manual placement of physical accelerometers or microphones, and careful ambient noise reduction in order to hear the weak acoustic sound emanating from a buried or underground source. The source may be human or that due to physical structural changes underground.

In the past, single Laser Doppler Velocimetry (LDV) or Laser Vibrometry systems have been used to measure the acoustic vibration/sound of a distant target. An example is the use of a laser beam bounced off of a distant window pane used to hear the conversations on the other side of the window. In this case, the LDV system acts as a remote, non-contact, microphone.

Also, in the past, locating an underground passive object has been conducted using reflected acoustic pulses (produced by an explosive charge) and detecting the time-delayed acoustic signals using three or more acoustic microphones placed at several remote (moderate distances) locations from the explosive charge. This technique is often used in geology to locate and map underground oil reserves or structures. The location of the underground structures is determined by cross-correlation of the time-delayed microphone signals and triangulation in three dimensions of the acoustic emanating signals. A similar triangulation technique is used in seismology to locate the position of earthquakes sensed by several seismic recorders located around the globe.

There remains a need in the art for a system and method for locating an underground acoustic source using multiple LDV beams and triangulation of the cross-correlated acoustic signals.

However, in view of the prior art considered as a whole at the time the present invention was made, it was not obvious to those of ordinary skill in the pertinent art how the identified need could be fulfilled.

SUMMARY OF INVENTION

This invention relates to detecting and locating an acoustic source, such as a buried person under a demolished building, or an acoustic source located above ground or along the surface of the ground or located within any material substance or in close proximity to a material substance.

This invention is related to the use of three (or more) LDV or Laser Vibrometry beams as projected, remote, non-contact, microphones to detect the acoustic sounds emitted by a source. The unique location of the acoustic source is determined by cross-correlation of the three separately time-delayed LDV signals and triangulation of the three time-delayed signals. The triangulation procedure involves using the measured relative time delay of the three acoustic signals and mapping the unique location of the sound source that would produce the measured relative time-delay values. The triangulation procedure can be applied to a single acoustic pulse emitted by the sound source, and also works for a continuous wave (CW) acoustic varying signal because the cross-correlation of the three acoustic signals identifies the common acoustic signatures and their relative time-delayed values.

In accordance with a particular embodiment, the present invention provides a multi-beam, non-contact, laser vibrometer adapted to locate, via triangulation, an acoustic source buried underground.

The laser Doppler vibrometer (LDV) (also called Laser Vibrometry) is a laser remote sensing (lidar or laser radar) system. In operation, the LDV system transmits a narrow laser beam toward a distant target area and detects the backscattered laser radiation from the target area. An LDV usually measures the vibrational movement of the targeted area by detection of the Doppler shifted wavelength of the backscattered laser radiation. However, other lidar detection techniques can also be used to measure the vibrational movement or spatial movement of a target area including detection of CW lidar amplitude modulated backscattered returns, and temporal detection of high repetition rate individual lidar pulses using time of flight information to extract the vibrational movement of the target area.

In accordance with the present invention, a method for determining the three-dimensional location of a vibrating target is provided, the method includes the steps of, transmitting at least three optical signals substantially simultaneously to contact a surface of interest at three contact locations on a surface of interest, each of the three contact locations separated from the other contact locations by a known distance, receiving at least three backreflected optical signals from the surface of interest, each backreflected optical signal corresponding to each of the at least three transmitted optical signals, sensing an acoustic vibration signal in each of the at least three backreflected optical signals, measuring the delay interval for a common noise pulse or waveform signature for each of the at least three transmitted optical signals, and determining the three-dimensional location of a vibrating target below the surface of interest through cross-correlation of the acoustic vibration signal in each of the at least three backreflected optical signals and triangulation of the measured delay intervals.

While the present invention is useful for locating acoustic sources underground, it is also within the scope of the invention to provide a system and method for determining the location of an acoustic source above ground, along the ground's surface, or within any material substance using the three LDV remote microphones and triangulation of the cross-correlated acoustic signatures.

In a specific embodiment, a lidar system is used to transmit, receive and sense the acoustic vibration signal. Using a lidar system, the step of sensing an acoustic vibration signal in each of the three backreflected optical signals further includes identifying a differential amplitude between the transmitted optical signal and the backreflected optical signal.

In an additional embodiment, a Laser Doppler Vibrometer (LDV) is used to transmit, receive and sense the acoustic vibration signal. Using an LDV, the step of sensing an acoustic vibration signal in each of the three backreflected optical signals further comprises, identifying a Doppler shifted wavelength between the transmitted optical signal and the backreflected optical signal.

In addition to determining the location of a vibrating target in three dimensions, it is also within the scope of the present invention to determine the location of the target in two dimensions, leaving one level of ambiguity as to the exact location of the target under the surface. In accordance with this embodiment, three optical signals originating within a two dimensional surface are used to determine the locations of the vibrating target.

The location of an acoustic source near the surface requires three or more LDV acoustic vibration signals located a sufficient distance apart and separated in angle along a two dimensional plane (surface of the ground) so as to enhance the accuracy of the determined location of the acoustic source. The location of an acoustic source in three dimensions requires three or more LDV signals located sufficiently apart spatially in three dimensions in order to enhance the accuracy of the deduced location of the noise source. The accuracy of the location measurement of the noise source is enhanced when the relative spatial and directional separation between the different LDV optical signal locations is maximized.

The triangulation technique involves knowledge of the velocity of sound within the medium and the generation of time-delayed three-dimensional geometric ellipsoids (and their surfaces) each representing the differences in the acoustic signal for each pair of optical acoustic signals. The geometric intersection in space of the ellipsoid surfaces yields the location of the acoustic source. The use of only two acoustic signals yields one ellipsoid surface, which if intersected by the plane of the ground, would yield an ellipse along the ground for the possible location of the acoustic source. Three acoustic signals located along the surface of the ground (two dimensional plane) would yield the location of the acoustic source along the surface of the ground. Three acoustic signals located at three locations in three dimensions (x, y, and z coordinates) would yield the three dimensional location (x, y, and z coordinates) of the acoustic source.

In accordance with the present invention, a system for determining the location of a vibrating target near a surface of interest is provided, the system includes an optical signal transmitter positioned to transmit at least three optical signals substantially simultaneously to contact a surface at three contact locations on a surface of interest, each of the three contact locations separated from the other contact locations by a known distance, an optical signal receiver positioned to receive at least three backreflected optical signals from the surface of interest, each backreflected optical signal corresponding to each of the at least three transmitted optical signals, a sensor for sensing an acoustic vibration signal in each of the at least three backreflected optical signals, a processor for calculating a delay interval for each of the at least three transmitted optical signals and a signal processor for determining the location of a vibrating target below the surface of interest through cross-correlation of the acoustic vibration signal in each of the at least three backreflected optical signals and triangulation of the calculated delay intervals.

In a particular embodiment, the system includes the means for transmitting and receiving three optical signals. The three signals allow for exact location of the target utilizing three dimensions.

In a specific embodiment, the system is implemented utilizing a lidar system.

In an additional embodiment, the system is implemented utilizing an LDV system.

The optical signals may be generated from a common laser source, or they may be generated from three distinct laser sources. In the case of a common laser source, beamsplitters are used to establish the three optical signals and receivers positioned on the backside of the beamsplitters are used to receive the backscattered signal reflected from the surface of interest.

In a particular embodiment, three or more laser doppler vibrometer (LDV) beams are utilized as remote microphones to triangulate the location of a underground sound source using the differences in the time of arrival of the common noise pulse.

In an additional embodiment, the system in accordance with the present invention is positioned on a robot carrier wherein the three laser beams are spread out in three different directions toward the ground and are used to map the location of an acoustic source.

The system and method in accordance with the present invention can be used to locate survivors underground or under a rubble pile, if they call out or produce another type of noise. The system may also be used to identify other underground acoustic sources and to identify seismic activity at different locations that need to be correlated.

The present invention will immediately benefit companies who are designing sensors on ground vehicles for military and emergency response. The system and method in accordance with the present invention provides a non-contact detection and location of buried acoustic sources, which will be useful for locating signaling humans and will assist in the structural analysis of damaged building based upon structural movement.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In accordance with the present invention, three-dimensional mapping of an acoustic source is provided by simultaneously directing several laser beams, Laser Doppler Velocimeters (LDVs), at different places and measuring the simultaneous acoustic vibrations of the reflecting surfaces.

Figure 1:
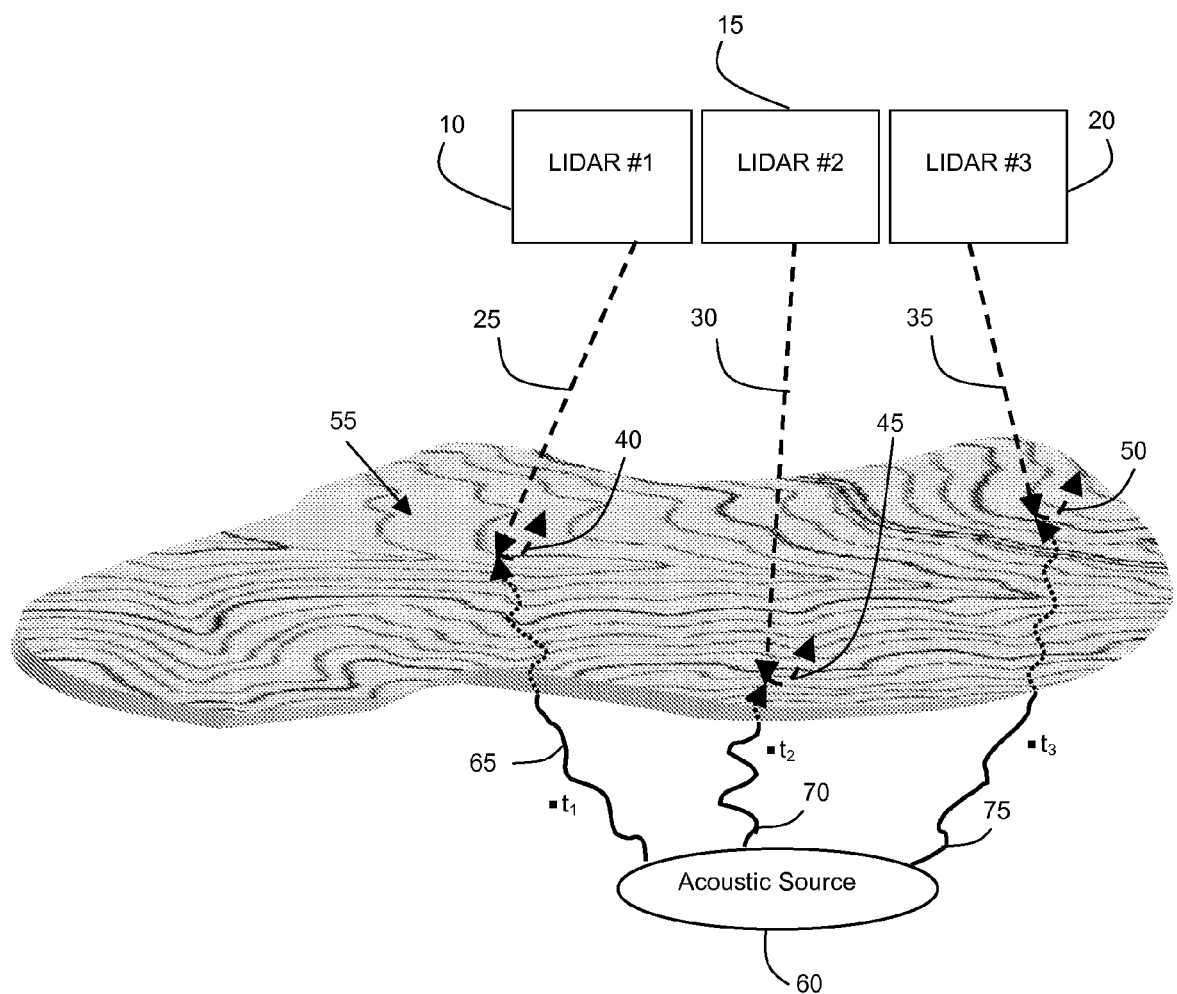
FIG. 1 is an illustrative view of a system utilizing three LDV units in accordance with the present invention.

With reference to FIG. 1, three lidar systems 10, 15, 20 are positioned at predetermined locations relative to one another. Lidar systems are light detection and ranging systems that are used to determine the distance to an object or surface using laser pulses. The range to an object is determined by measuring the time delay between transmission of a pulse and detection of the reflected signal. In a specific embodiment, the systems may be on the order of 20 feet or more apart. In this embodiment, the propagation difference for the laser beams emitted from each of the three lidar systems is essentially negligible because the speed of light is known to be orders of magnitude greater than the speed of sound. As such, the propagation delay times of sound for the three lidar signals are identified as ■$t_1$ 65, ■$t_2$ 70 and ■$t_3$ 75 respectively. The lidar systems each send out a laser beam 25, 30, 35 that is backreflected 40, 45, 50 from a hard target, such as the surface of the ground 55, and detected by a telescope and optical detector at the lidar system 10, 15, 20. The movement of the underground acoustic target area 60 modulates the backreflected laser light. If the target area is vibrating at an acoustic frequency (ie. like a drum head), then the backscattered laser light is also modulated in intensity at the acoustic frequency. In other words, the lidar acts as a remote microphone that picks up the acoustic vibrations (sounds) of the target area. The lidar system measures the changes in the amplitude. Additionally, a more sensitive technique may be implemented utilizing three LDVs in place of the lidar system to identify the Doppler shifted wavelength of the laser light to measure the vibration of the target.

Utilizing the configuration as shown in FIG. 1, the location of the acoustic source can be triangulated by signal processing the multiple lidar signals, and extracting the relative delay time of the signal using the temporal cross correlation of the signals. In signal processing, the cross-correlation is a measure of similarity of two signals, commonly used to find features in an unknown signal by comparing it to a known one. Triangulation involves calculating the intersection of the appropriate three geometrical ellipsoids associated with the relative time delays measured from a single noise signal. In accordance with the present invention, triangulation can be used to identify the difference in arrival time of an isolated source relative to each lidar system. The speed of sound inside of the ground may be about 10,000 ft/s, so that differences of 100 ft. produce a time-delayed difference signal of about $1/100$ of a second. The wavelength of a 1000 Hz sound traveling underground is about 10 ft. As such, the spacing of the beams as described allows for a temporal correlation signal processing approach utilizing lidar triangulation Additionally, the configuration of the present invention also helps to reject common ambient noise. The ambient noise can be subtracted out by the multiple detectors, thus eliminating the current need to turn off all sound sources in order to hear the signal. The relative position of the laser beams on the ground can be easily and rapidly changed to improve the signal-to-noise ratio, thereby changing the absolute values of the time delayed signals, but not the relative values nor the calculated triangulated position of the acoustic source. This is in contrast to the difficulty in placing physical microphones along the ground and varying their locations.

As such, in accordance with the present invention the LDV or lidar acts like a remote microphone and measures the acoustic vibrations of the target area illuminated by the small (1 cm diameter) laser beam. In a specific embodiment, the lidar or LDV may be 5 to 20 ft away from the target area.

Figure 2:
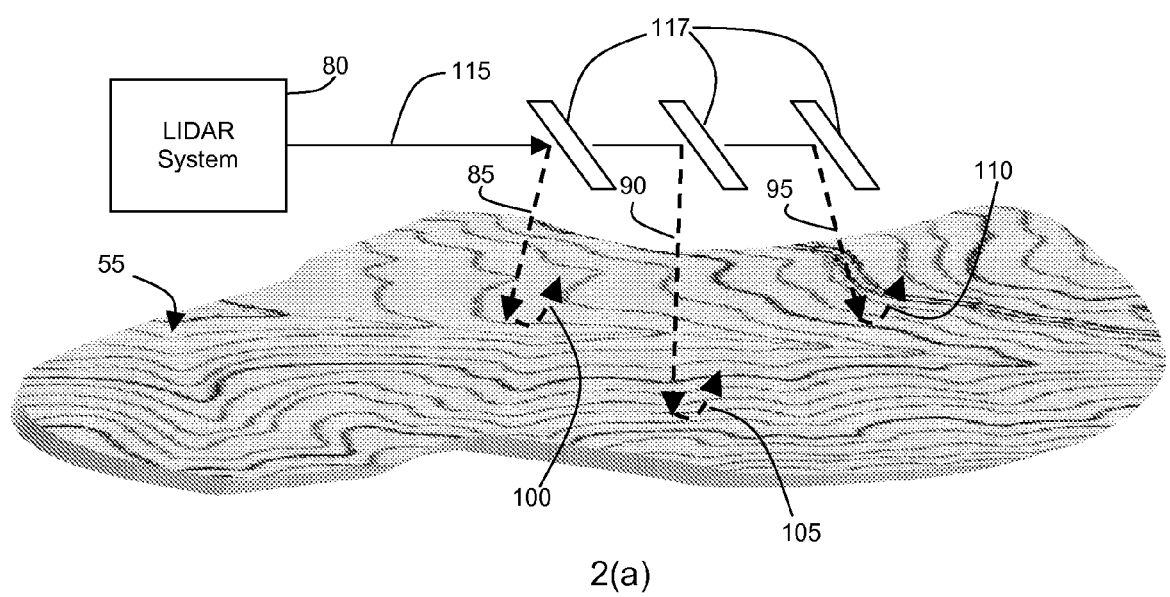
FIG. 2 is an illustrative view of a system utilizing a single LDV unit in addition to a beam splitter and/or beam steering mirror in accordance with the present invention.
Figure 2:
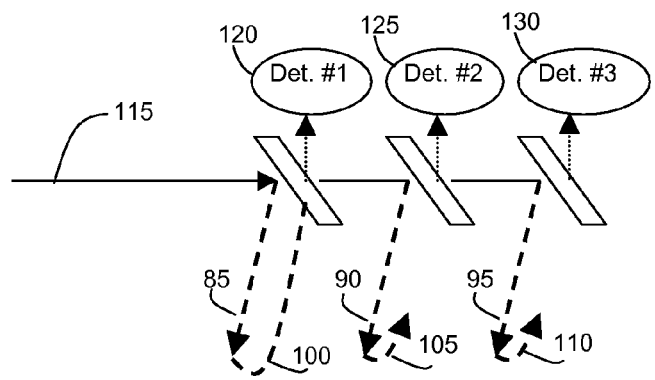

In an additional embodiment, as show with reference to FIG. 2, one lidar 80 is utilized with multiple transmit beams 85, 90, 95 and multiple backscattered beams 100, 105, 110. FIG. 2(a) illustrates an embodiment in which the transmit beam 115 from the lidar system 80 is split into three separate beams 100, 105, 110 utilizing a beam splitter 117. FIG. 2(b) illustrates how multiple detectors 120, 125, 130 could be positioned on the backside of the beam splitter 117 for detection of the reflected signals 100, 105, 110. In a specific embodiment utilizing a single lidar systems, the lidar system 80 may be positioned on the top of a tower and the three lidar beams 100, 105, 110 directed toward the ground 55 at a location about 20 ft from the base of the tower and at three different locations around the tower (ie. at 0 degrees, 120 degrees, and at 240 degrees). The three lidar beams now measure simultaneously the acoustic vibrations of the three targeted areas. If there is a pulsed acoustic sound source located underground near the base of the tower, then the time it takes for the sound pulse to reach each of the lidar detectors is dependent upon the distance that each detector (lidar illuminated target area) is from the sound source. By cross correlation of the lidar measured sound signal for all three lidars, the unique 3-D location of the sound source can be calculated.

The position and location of the different laser beams on the ground can be easily and rapidly changed in order to maximize the signal measured from the acoustic source and reduce the background noise. In addition, rapid changing of the location of the laser beams also allows for the optimization and changing of the resultant geometric acoustic time-delay ellipsoids and their geometric intersection in order to optimize the determined location of the acoustic source.

It is within the scope of the present invention to utilize a variety of laser sources, including, but not limited to a low power commercial LDV source and a high power (100 mW) eye-safe laser at 1.5 microns. The various sources will provide a variety of detections ranges.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described.

What is claimed is:

1. A method for determining the location of a vibrating target, the method comprising the steps of:
    transmitting at least three optical signals substantially simultaneously to contact a surface of interest that is receiving a vibration from a vibrating target, wherein each of the three optical signals contacts the surface at each of three contact locations, each of the three contact locations separated from each of the other contact locations by a known distance and direction;
    receiving at least three backreflected optical signals from the surface of interest, each backreflected optical signal corresponding to each of the at least three transmitted optical signals;
    sensing the acoustic vibration signal in each of the at least three backreflected optical signals;
    measuring a plurality of delay intervals for a common acoustic signature received from the acoustic vibration signal sensed at each of the plurality of locations on the surface of interest; and
    determining the location of a vibrating target through cross-correlation of the acoustic vibration signal sensed at each of the plurality of locations and triangulation of the plurality of measured delay intervals.

2. The method of claim 1, wherein the step of sensing an acoustic vibration signal in each of the at least three backreflected optical signals further comprises, identifying a differential amplitude between the transmitted optical signal and the backreflected optical signal.

3. The method of claim 1, wherein the step of sensing an acoustic vibration signal in each of the at least three backreflected optical signals further comprises, identifying a Doppler shifted wavelength between the transmitted optical signal and the backreflected optical signal.

4. The method of claim 1, wherein the vibrating target is located below the surface of interest.

5. The method of claim 1, wherein the vibrating target is located above the surface of interest.

6. The method of claim 1, wherein the vibrating target is located adjacent to the surface of interest.

7. The method of claim 1, wherein the distance between the contact locations is between 5 ft and 20 ft.

8. A system for determining the location of a vibrating target, the system comprising:
- an optical signal transmitter positioned to transmit three optical signals substantially simultaneously to contact a surface that is receiving a vibration from a vibrating target, wherein each of the three optical signals contacts the surface at each of three contact locations on the surface of interest, each of the three contact locations separated from the other contact locations by a known distance and direction;
- an optical signal receiver positioned to receive three backreflected optical signals from the surface of interest, each backreflected optical signal corresponding to each of the three transmitted optical signals;
- a sensor for sensing an acoustic vibration signal in each of the three backreflected optical signals;
- a processor for measuring a delay interval for each of the three transmitted optical signals; and
- a signal processor for determining the three-dimensional location of the vibrating target through cross-correlation of the acoustic vibration signal in each of the three backreflected optical signals and triangulation of the delay intervals.

9. The system of claim 8, wherein the vibrating target is below the surface of interest.

10. The system of claim 8, wherein the vibrating target is above the surface of interest.

11. The system of claim 8, wherein the vibrating target is adjacent to the surface of interest.

12. The system of claim 8, wherein the optical signal transmitter, the optical signal receiver and the sensor are components of a lidar system.

13. The system of claim 8, wherein the optical signal transmitter, the optical signal receiver and the sensor are components of a laser Doppler vibrometer system.

14. The system of claim 8, wherein the optical signal transmitter comprises a plurality of optical signal transmitters, each of the transmitters to transmit an optical signal.

15. The system of claim 8, wherein the optical signal receiver comprises a plurality of optical signal receivers, each of the receivers to receive an optical signal.

16. The system of claim 8, wherein the optical signal transmitter further comprises at least one beam splitter, the at least one beam splitter to transmit at least one of the three optical signals.

17. The system of claim 16, wherein the optical signal receiver further comprises at least one receiving elements positioned on a back side of the at least one beam splitter, each receiving elements to receive one of the three optical signals.

18. The system of claim 8, wherein the optical signal transmitter, the optical signal receiver and the sensor are positioned on a robot carrier.

* * * * *